United States Patent Office 3,015,850
Patented Jan. 9, 1962

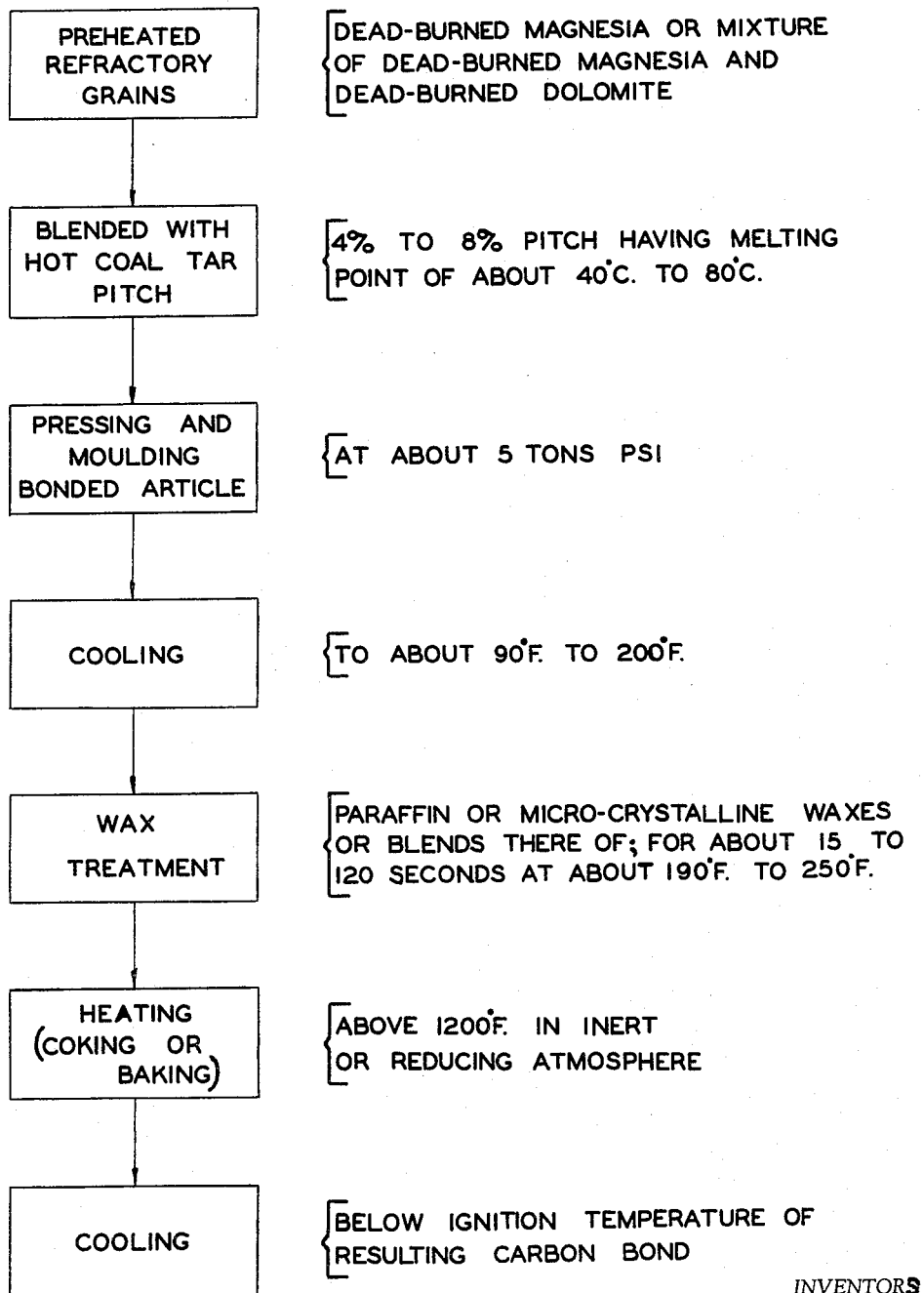

3,015,850
CARBON BONDED REFRACTORY ARTICLE AND PROCESS OF MANUFACTURE
Samuel Rusoff and Robert S. Drabkowski, Tiffin, Ohio, assignors to Basic, Incorporated, Cleveland, Ohio, a corporation of Ohio
Filed Jan. 19, 1959, Ser. No. 787,410
15 Claims. (Cl. 18—47.5)

The present invention relates to an improved refractory article of any desired shape, such as a brick, which is bonded with a carbon material. The chief improvement attained in such articles is increased mechanical strength.

It has been customary to produce refractory brick or other shapes of dead-burned dolomite and/or dead-burned magnesia with a carbon bond by blending a small amount of hot coal tar pitch with the preheated refractory grains, pressing the blend while hot into any desired shape, and then heating the shaped blend in a reducing or inert atmosphere to temperatures of 1200° F. to 2300° F. or even higher. During the heating step the coal tar pitch undergoes a pyrolytic reaction or "cracks." This reaction is similar to that which takes place in petroleum cracking stills or in the carbon electrode manufacturing process in which an initial binder of coal tar pitch is subsequently coked to form a carbon bond. During the course of the pyrolytic or "cracking" reaction, a volatile hydrocarbon fraction distills off to leave a residual carbon material or "coke" which serves to bond the refractory particles into one common mass. This process of heating or baking the refractory is hereinafter referred to as "coking." Brick produced in this manner have been widely used for lining various types of steelmaking furnaces, such as basic open hearth and electric furnaces. These brick are used extensively for lining basic Thomas converters and the more recently developed oxygen converter.

The steps of heating the brick to produce the carbon bond may be carried out in special furnaces or ovens. Various means are used to protect the shapes from oxidizing atmospheres which would burn out the carbon bond. In the instance of large shapes, the pieces are molded or rammed into a steel form which, with an accompanying cast-iron bottom plate and cover, effectively protect the carbon bond formed during the baking step. One means of providing the needed protection against oxidation is to pack the brick in finely ground carbon such as graphite or coke using a suitable heat-resistant container, and then to heat the container and contents to the desired temperature. After proper heat treatment the brick are cooled in the inert atmosphere until their temperature is below the ignition point of the carbon bond. They may then be cooled more rapidly by circulation of cool air over the brick. The latter are then ready for installation as linings in metallurgical furnaces.

Another method of heating the brick to produce the pyrolytic "cracking" or "coking" is first to install the uncoked pitch-bonded brick in the metallurgical furnace and then, in the instance of the electric furnace, rapidly heat the entire lining by means of an electric arc; or, in the instance of the oxygen converter, by introducing a charge of incandescent coke which is then kept burning vigorously by the introduction of controlled amounts of oxygen. The burning of the coke is so maintained that the combustion gases are of a reducing nature and protect the residual carbon bond within the brick. By the rapid heating, the brick are progressively coked from their interior surface toward the outer surface. This coking may be completely accomplished at the time of the initial heating or, in the case of thick refractory linings, it may be accomplished during the subsequent use of the furnace for steelmaking wherein successive heats of molten steel are brought up to high temperatures, refined, and tapped off into ladles.

The strength of the bond formed on coking is a very important property or characteristic of this type of brick. During actual use as a lining in a steel furnace, such as the oxygen converter, the brick are subjected to severe mechanical impact and abrasion arising from the charging of heavy pieces of scrap iron and of amendments and fluxes such as lump limestone and iron ore. Besides this mechanical abuse, the lining is subjected to the severe washing action and the severe fluxing action of the very hot and vigorously agitated slag. Moreover, the lining may vary in temperature between 2000° F., after a heat has been tapped into the ladle, to 3200° F. during the blowing with oxygen. These temperature variations cause rapid contractions and expansions in the refractory brick lining with consequent development of great mechanical stresses. These stresses can cause spalling of hot layers of the brick from the cooler portions near the outer steel shell of the furnace. Consequently, the nature and quality of the carbon bond is of great importance in such brick. It must be both strong and resilient for the brick to withstand mechanical as well as thermal stresses to which they are subjected.

We have now found that the mechanical strength of the carbon-bonded brick can be markedly increased by an appropriate treatment of the coal tar pitch-bonded brick or other shapes with petroleum waxes prior to coking. This treatment increases the strength of the final coked brick by 50 percent to 200 percent as compared to similar brick coked without such wax treatment. The treatment effectively increases the strength of brick composed entirely of dead-burned magnesia, but it is even more effective with brick made up of mixtures of dead-burned dolomite and dead-burned magnesia.

It is therefore a principal object of this invention to provide increased mechanical strength in carbon-bonded refractory articles composed of dead-burned magnesia, or mixtures thereof with dead-burned dolomite, the carbon bond being formed on cracking or coking the initial coal-tar pitch bond by heating the brick to an elevated temperature.

It is another object to provide a brick composed of dead-burned magnesia, or of mixtures of dead-burned magnesia and dead-burned dolomite having a coal tar pitch bond or binder and an interior impregnation of a petroleum wax, which after heating to coking temperatures will have a high mechanical strength.

Another object is to provide a brick composed of dead-burned magnesia or of mixtures of dead-burned dolomite and dead-burned magnesia that is strongly bonded with a carbon material.

A further object is to provide a brick composed of dead-burned magnesia or of dead-burned dolomite with dead-burned magnesia having petroleum wax either upon the surface or substantially impregnated into the interior of the brick to promote the formation of a strong carbon bond by coking.

A still further object is to provide a method of making an improved brick with a carbon bond and composed of dead-burned magnesia or of mixtures of dead-burned magnesia and dead-burned dolomite.

A still further object is to provide a method of treating coal tar pitch-bonded refractory brick composed of dead-burned magnesia or of mixtures of dead-burned dolomite and dead-burned magnesia with a petroleum wax prior to coking to promote the subsequent formation during coking of a strong carbon bond.

Further objects will become apparent as the description proceeds.

To the accomplishment of the foregoing and related ends, the invention consists of the features hereinafter fully described and particularly pointed out in the claims, the following disclosure describing in detail the invention, such disclosure illustrating however, but one or more of the various ways in which the invention may be practiced.

The accompanying drawing represents a flow diagram from which a description of the present invention may be followed. It is emphasized that the diagram is intended to be illustrative of only one way in which the invention may be practiced and should not be construed as imparting limitations on the claims unless specifically set forth in such claims.

In carrying out the present invention, the pitch-bonded brick or other like refractory articles are manufactured in the usual manner. The refractory of dead-burned magnesia, or of mixed dead-burned dolomite and dead-burned magnesia, is sized into grains varying from pieces as large as ½ inch in cross-section down to finely ground particles passing through a 200 mesh U.S. Standard sieve. The dead-burned dolomite fraction may constitute 40 to 80 percent of the entire blend of refractory grains. The size gradation is selected to give, upon compaction, as dense a mass as possible with a minimum of voids. The size gradation chosen may be any of those known to persons skilled in the art. The selected refractory grains are heated to 225° F. to 325° F. and then blended with 4 to 8 percent of preheated pitch. The preheating of the pitch is to a temperature which merely renders the pitch more fluid.

The pitches generally used are derived from coal tar and have melting points of 40° C. to 100° C. as measured by the A.S.T.M. Method of Test D36–26. In some instances coal tar itself is used for bonding such refractories, coal tar pitch being free of the lower boiling constituents ordinarily found in coal tar. Some of the bituminous asphalts may be used provided they have the property of decomposing pyrolytically to form a substantial carbon residue. Many asphalts do not have this property but rather distill in their entirety upon heating and therefore are not usable. Consequently, the coal tar pitches are more generally used as the binder in this type of refractory brick.

The hot mixture of refractory grains and pitch are molded into the desired shapes by pressing at high pressures or by intensive tamping. After pressing, the brick are cooled to such a temperature that the pitch stiffens and the brick themselves are not subject to deformation upon handling.

The cooled brick at temperatures of 90° F. to 200° F. are ready for application of the molten petroleum wax, which may be applied by dipping in a bath of the wax or by spraying or splashing the brick with molten wax. The temperature of the wax at the time of application may be varied between 190° F. and 250° F. depending upon the method of application and upon the melting point of the wax itself. The time of dipping or spraying may be varied between 15 and 120 seconds with little difference being noted in the ultimate strength of the coked brick. A dipping period of 60 seconds has been found quite satisfactory though the temperature and resultant viscosity of the molten wax, the size of the brick and the amount of agitation in the wax bath are minor factors which may affect the optimum dipping time. The molten petroleum wax may merely surface coat the brick or other refractory article, or penetrate into the brick as an impregnant, or be deposited as both a surface coat and impregnant, depending on temperatures used, length of dipping or immersing, etc.

At least two types of petroleum waxes have been found to improve the mechanical strength of the coked brick. These are:

(1) Paraffin waxes such as those produced in the United States from Appalachian and Mid-Continent crude oils. In the fully refined state the commercial grades of these paraffin waxes have melting points from 118° F. to 155° F. measured by the A.S.T.M. Method of Test D87–42. We have found that those paraffin waxes melting in the range of 123° F. to 131° F. to be most suitable, though those commercial grades of lower or higher melting points can be used satisfactorily.

(2) Microcrystalline waxes such as those obtained as a by-product in the de-waxing of motor oil distillates from residual oils, and from the settlings or "bottoms" withdrawn from crude oil storage tanks. Such waxes are characterized by their inherent solidification in the form of very small ("micro") malformed indistinct crystals. The microcrystalline waxes in comparison with the paraffin waxes generally have higher melting points, higher degrees of cohesion and adhesion, higher flexibilities and pliabilities. They have melting points within the range of 145° F. to about 196° F. as measured by the A.S.T.M. Method of Test D127–49. We have found that microcrystalline waxes ranging in their melting points from 150° F. to 165° F. to be most suitable. Commercial grades of lower and higher melting points are also satisfactory.

In accordance with the accepted practice of both manufacturers and users, we have specified the paraffin and microcrystalline waxes only by their melting ranges, using the mentioned A.S.T.M. methods of tests. We have found that blends of the paraffin and microcrystalline waxes are satisfactory also in promoting higher mechanical strengths in the coked brick. As an example, blends of about 25 percent to about 75 percent paraffin wax by weight with the balance microcrystalline wax may be used.

After the application of the wax, the brick may be suspended in any desired manner to permit any excess of wax to drain away. The brick may then be stored for later installation in the metallurgical furnace or they may be coked in a special furnace.

If the uncoked brick are used directly to line a metallurgical furnace, for example an oxygen converter, the brick may be heat treated or coked in place in the metallurgical furnace by any of the procedures generally used in the presently developed art. For instance, the lined vessel may be charged with incandescent coke which is kept burning by the introduction of air or oxygen so that the temperature of the lining is raised rapidly to 2000° F. to 2500° F. or even to the steelmaking temperature of about 3000° F.

If the pitch bond is to be transformed into a carbon bond prior to installation of the brick in a metallurgical furnace lining, the brick may be heat treated in special furnaces following any of the heating schedules now used for this type of brick or like refractory. The refractory articles are protected against oxidation of the carbon bond by any of the usual means such as those described above. In one instance, the shapes are moved through a tunnel furnace in which the different temperature zones are so regulated that the shapes are initially in contact with an atmosphere at 575° F. As they progress through the tunnel, the ambient temperature is raised so that within 60 hours the brick are in a zone of 1350° F. With further progression through the tunnel furnace, the temperatures of the zones are gradually reduced so that within a total of about 96 hours the ambient temperature is 300° F. This is less than the ignition temperature of the carbon bond within the brick, so they may be removed to an ordinary atmosphere for final cooling and storing. If the refractory shapes contain any substantial amount of dead-burned dolomite, they must be stored in an atmosphere of sufficient dryness to prevent the deleterious hydration of the contained calcium oxide. This is a necessary precaution in the storing of any brick containing dead-burned dolomite either with a pitch binder or with a carbon bond.

However it is to be noted that the treatment with molten petroleum wax not only gives marked improvement in the physical strength of the brick or shape, but in the instance of those brick containing substantial quantities of dead-burned dolomite, it also improves their resistance to the absorption of moisture and consequent hydration of the calcium oxide component of the dead-burned dolomite. The expansion accompanying such hydration causes cracking of the brick with their ultimate destruction. The effect of the wax is to so improve the hydration resistance of the brick that instead of having a storage life of only a few weeks in the humid summer atmosphere, the brick may be held in storage for a matter of two or three months, providing they have been properly treated with petroleum wax.

The above described treatment with a selected petroleum wax has been found to increase the crushing strength of a "dead-burned" magnesia brick bonded with carbon from 8600 p.s.i. to 10,500 p.s.i. With a brick composed of dead-burned dolomite and dead-burned magnesia and bonded with the coked carbon, the improvement is even more marked in that the crushing strength is increased from 3100 p.s.i. to as much as 7300 p.s.i. The effects of the wax treatment is evidenced still further in the examples which follow in the succeeding paragraphs. The waxes used in these examples were:

DESCRIPTION

*Wax #1.*—An Appalachian fully refined paraffin wax of melting point range 122/124° F. (A.S.T.M. D87–42) and of finely crystalline texture.

*Wax #2.*—A fully refined paraffin wax sold under the trade name of "Parawax" with a melting point range of 128/131° F. (A.S.T.M. D87–42). This wax had a coarsely crystalline texture.

*Wax #3.*—A microcrystalline wax sold under the trade name of "Superflex" and of melting point range 160/170° F. (A.S.T.M. D127–49).

A blended wax was used of the following composition and melting point.

Melting point, ° F.
*Wax #4.*—Blend of 25 percent by weight of Wax
  #1 and 75 percent by weight of Wax #3_____ [1] 156.0

The wax used in each example is hereinafter identified by the appropriate number. In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

Example I

A mixture of coarse grain dead-burned dolomite and fine granular dead-burned magnesia was heated to 280° F. and blended with approximately .6 percent by weight of preheated coal tar pitch. The latter had a softening point of 80° C. to 85° C. as measured by A.S.T.M. Method of Test D36–26. The hot mixture of refractory grains and pitch was pressed at 5 tons per square inch into dense cylinders of 3.5 inches in diameter and 2.125 inches in height. A portion of these specimens was cooled to 158° F. and immersed for 60 seconds in a batch of Wax #4 which had been heated to 220° F. After draining off excess wax and cooling the specimens, it was found that they had absorbed 0.63% of the molten wax. The waxed specimens and a portion of the unwaxed specimens were packed in graphite within a heat-resistance steel box having a closely fitting cover. The box and its contents were then placed in an electric furnace and heated gradually over a period of 6 hours to attain a temperature of approximately 1200° F. The temperature was held at this level for approximately 12 hours and then raised over a period of 3 hours to 1800° F. and held at the latter temperature for another 2 hours. The furnace and the contents were slowly cooled to below the ignition point of the carbon bond, before removing the box and unpacking the coked specimens. A crushing strength test showed the wax-treated specimens to have an average crushing strength of 5990 p.s.i., while the untreated specimens had an average strength of 3110 p.s.i.

Example II

Other specimens of coal tar pitch-bonded brick composed of dead-burned dolomite and dead-burned magnesia prepared in the same manner as in Example I were cooled to 158° F. and dipped for 15 seconds in a bath of Wax #4 held at 220° F. After cooling and draining, the specimens showed an absorption of wax equal to 0.67 percent of the original weight of the brick. These wax-treated specimens were then baked in an electric oven to produce a pyrolytic decomposition or coking in the same manner as described in Example I. Upon being tested for crushing strength, the wax-treated specimens showed an average strength of 4520 p.s.i. as compared to an average crushing strength of the untreated specimens of 3110 p.s.i.

Example III

Still further specimens of coal tar pitch-bonded brick composed of dead-burned dolomite and dead-burned magnesia prepared in the same manner as in Example I were cooled to 95° F. and then dipped for 90 seconds in a bath of Wax #4 maintained at a temperature of 210° F. After draining, the brick specimens showed an absorption of wax equal to 1.56 percent of their original weight. The wax-treated specimens were then coked in the same manner as in Example I. When tested for crushing strength, the wax-treated brick showed an average strength of 6380 p.s.i., as compared to 3110 p.s.i. for the untreated coked specimens.

Example IV

Cylindrical test specimens of 3.5 inches in diameter and 2.125 inches in height were pressed at 10,000 p.s.i. from a hot commercial mixture of coal tar pitch and refractory grains. The latter were made up of coarse dead-burned dolomite granules and finely ground dead-burned magnesia. After pressing, the test specimens were cooled to 160° F. and then immersed for 60 seconds in a bath of Wax #2 maintained at 220° F. After draining, the wax absorption was found to be 0.39 percent of the original weight of the specimens. The wax-treated specimens were then baked according to the heating schedule described in Example I so as to produce the desired formation of a carbon bond by pyrolytic reaction. After coking, the specimens were crushed in a strength testing machine. The wax-treated coked specimens showed an average crushing strength of 5760 p.s.i. as compared to an average crushing strength of 2770 p.s.i. found with the specimens not treated with wax prior to coking.

Example V

Further cylindrical test specimens of coal tar pitch-bonded refractory composed of dead-burned dolomite grains and finely ground dead-burned magnesia were brought to a temperature of 160° F. and then immersed for 60 seconds in a bath of Wax #3 maintained at 220° F. After draining and cooling, the specimens were found to be 0.49 percent in excess of the original weight due to the absorption of wax. These specimens, along with unwaxed specimens, were then coked to produce a carbon bond according to the heating schedule described in Example I. The coked specimens were then crushed in a strength testing machine. The crushing strengths found for the wax-treated and untreated specimens were 5850 p.s.i. and 2770 p.s.i., respectively.

Example VI

A blend of coarse and fine grains of dead-burned magnesia was heated to approximately 280° F. and blended with 6 percent of a coal tar pitch. The latter had a softening point of 70° C. to 75° C. as measured by A.S.T.M. Method of Test D36–26. The mixture of refractory and tar was pressed at 5 tons per sq. in. into dense cylinders of 3.5 in. in diameter and 2.125 in. in height. Two of the cylinders were allowed to cool to ---
[1] As determined by A.S.T.M. D87–42.

160° F. and then dipped for 60 seconds in a bath of molten Wax #3. These two specimens along with two others that had not been treated with wax were then packed in graphite within a heat-resistant steel box having a closely fitting cover. The box and its contents were then heated gradually in an electric furnace over a period of 17½ hours to 1200° F. The contents were maintained at 1200° F. for 2½ hours and then permitted to gradually cool over a period of 16 hours. The specimens were then crushed in a strength testing machine. The specimens which had been treated with wax showed an average crushing strength of 16,300 p.s.i., while those which had not been treated with wax showed a crushing strength of only 11,400 p.s.i.

It will now be apparent that we have provided a method of materially increasing the mechanical strength of carbon bonded refractory articles and particularly refractory bricks of dead-burned magnesia and dead-burned dolomite bonded with a coal tar pitch. The physical and/or chemical reactions that take place within or about the refractory article are not fully understood, although the data as indicated clearly show that a marked increase in strength does occur. Accordingly, in the accompanying claims, the novel refractory product of the present invention is claimed in terms of the method of producing it.

Other forms embodying the features of the invention may be employed, change being made as regards the features herein disclosed, provided those stated by any of the following claims or the equivalent of such features be employed.

We therefore particularly point out and distinctly claim as our invention:

1. In the method of coking an article composed of refractory grains selected from the class consisting of dead-burned magnesia and a mixture of dead-burned magnesia and dead-burned dolomite and bonded with a coal tar pitch; the improvements of applying to the article a petroleum wax selected from the class consisting of paraffin waxes and mycrocrystalline waxes, heating to a temperature sufficient to pyrolytically decompose the coal tar pitch and produce a carbon bond, and then cooling the brick to a temperature below the ignition temperature of such carbon bond.

2. The method of claim 1 wherein the application of the petroleum wax to the article is by dipping it into a molten bath of such wax maintained at a temperature within the range of about 190° F. to about 250° F.

3. The method of claim 1 wherein the application of the petroleum wax to the article is by dipping it for about 15 seconds to about 120 seconds into a molten bath of such wax.

4. The method of claim 1 wherein such dead-burned dolomite grains comprise about 40 percent to about 80 percent by weight of such mixture of grains.

5. In the method of coking a brick composed of refractory grains selected from the class consisting of dead-burned magnesia and a mixture of dead-burned magnesia and dead-burned dolomite and bonded with a coal tar pitch; the improvements of immersing the brick in a molten bath of a paraffin wax having a melting point within the range of about 118° F. to about 155° F. to apply some of such wax to the brick, heating the brick to at least 1200° F. to pyrolytically decompose the coal tar pitch and produce a carbon bond for refractory grains, and then cooling the brick to a temperature below the ignition temperature of such carbon bond.

6. The method of claim 5 wherein such paraffin wax has a melting point within the range of about 123° F. to about 131° F.

7. In the method of coking a brick composed of refractory grains selected from the class consisting of dead-burned magnesia and a mixture of dead-burned magnesia and dead-burned dolomite and bonded with a coal tar pitch; the improvements of immersing the brick in a molten bath of a microcrystalline wax having a melting point within the range of about 145° F. to about 196° F. to apply some of such wax to a brick, heating the brick to at least 1200° F. to pyrolytically decompose the coal tar pitch and produce a carbon bond for such refractory grains, and then cooling the brick to a temperature below the ignition temperature of such carbon bond.

8. The method of claim 7 wherein such microcrystalline wax has a melting point within the range of about 150° F. to about 165° F.

9. A method of producing a refractory article having increased mechanical strength comprising the steps of molding a mixture of refractory grains and a binder of a coal tar pitch to a desired shape, applying a petroleum wax to the shaped mixture, and then heating to a temperature sufficient to pyrolytically decompose the coal tar pitch and produce a carbon bond.

10. The method of claim 9 wherein such petroleum wax is a blend consisting essentially of about 25 percent to about 75 percent by weight of paraffin wax and the balance microcrystalline wax.

11. A method of producing a refractory article having increased mechanical strength comprising the steps of mixing refractory grains selected from the class consisting of dead-burned magnesia and a mixture of dead-burned magnesia and dead-burned dolomite with a sufficient amount of coal tar pitch to bind the grains together, pressure molding the bonded grains into a desired shape, immersing such shape into a molten bath of petroleum wax selected from the class consisting of paraffin waxes and microcrystalline waxes to apply some of such wax to such shape, heating such shape in an inert atmosphere to at least 1200° F. to pyrolytically decompose the coal tar pitch and produce a carbon bond improved by the presence of such petroleum wax, and then cooling such shape to a temperature below the ignition temperature of such carbon bond.

12. The refractory article produced by the method of claim 9.

13. A method of producing a refractory article having increased mechanical strength comprising the steps of mixing at a temperature above about 200° F. refractory grains selected from the class consisting of dead-burned magnesia and a mixture of dead-burned magnesia and dead-burned dolomite with about 4 percent to about 8 percent by weight of the total mixture of a coal tar pitch to bind the grains together, pressure molding the bonded grains into a desired shape, cooling such shape below 200° F., immersing such shape into a molten bath of a petroleum wax maintained at a temperature within the range of about 190° F. to about 250° F. to apply some of such wax to such shape, said petroleum wax being selected from the class consisting of paraffin waxes and microcrystalline waxes, heating such shape in a reducing atmosphere with respect to such shape to at least 1200° F. to pyrolytically decompose the coal tar pitch and produce a carbon bond improved by the presence of such petroleum wax, and then cooling such shape to a temperature below the ignition temperature of such carbon bond.

14. A method of producing a refractory brick having increased mechanical strength the steps of heating refractory grains selected from the class consisting of dead-burned magnesia and a mixture of dead-burned magnesia and dead-burned dolomite to a temperature within the range of about 225° F. to about 325° F., mixing the heated refractory grains with about 4 percent to about 8 percent by weight of the total mixture of a coal tar pitch to bind the grains together, such pitch having a melting point within the range of about 40° C. to about 100° C., pressure molding the thus bonded grains into a brick shape, cooling the brick shape to a temperature within the range of about 90° F. to about 200° F., immersing such brick shape for about 15 seconds to about 120 seconds into a molten bath of a petroleum wax maintained at a temperature within the range of about 190° F. to about 250° F. to apply some of such wax to such brick shape, said petroleum wax being selected from the class consisting of paraffin waxes and microcrystalline waxes, heating the brick in an inert atmosphere to at least 1200° F. and for a sufficient time to pyrolytically decompose the coal tar pitch and produce a carbon bond improved by the presence of such petroleum wax, and then cooling the brick shape to a temperature below the ignition temperature of such carbon bond.

15. The method of claim 14 wherein such dead-burned dolomite grains comprise about 40 percent to about 80 percent by weight of such mixture of grains.

References Cited in the file of this patent
UNITED STATES PATENTS

| | | |
|---|---|---|
| 345,305 | Hunt | July 13, 1886 |
| 1,503,150 | Brockbank | July 29, 1924 |
| 1,549,867 | Graveman | Aug. 18, 1925 |
| 2,407,868 | Burke | Sept. 17, 1946 |
| 2,527,596 | Shea et al. | Oct. 31, 1950 |
| 2,652,354 | Dryden et al. | Sept. 15, 1953 |